(12) United States Patent
Nguyen et al.

(10) Patent No.: US 10,693,662 B2
(45) Date of Patent: Jun. 23, 2020

(54) METHODS FOR SECURE SERIALIZATION OF SUPPLY CHAIN PRODUCT UNITS

(71) Applicant: IDLOGIQ INC., Santa Clara, CA (US)

(72) Inventors: Kelly D. X. Nguyen, Cerritos, CA (US); Duc N. Pham, Cupertino, CA (US)

(73) Assignee: IDLOGIQ INC., Buena Park, CA (US)

( * ) Notice: Subject to any disclaimer, the term of this patent is extended or adjusted under 35 U.S.C. 154(b) by 270 days.

(21) Appl. No.: 15/903,017

(22) Filed: Feb. 22, 2018

(65) Prior Publication Data

US 2019/0260592 A1    Aug. 22, 2019

(51) Int. Cl.
| | | |
|---|---|---|
| *H04L 9/32* | (2006.01) | |
| *G06Q 10/08* | (2012.01) | |
| *H04L 9/06* | (2006.01) | |
| *G06Q 30/00* | (2012.01) | |

(52) U.S. Cl.
CPC ....... *H04L 9/3247* (2013.01); *G06Q 10/0832* (2013.01); *G06Q 10/0833* (2013.01); *G06Q 30/0185* (2013.01); *H04L 9/0643* (2013.01)

(58) Field of Classification Search
CPC . H04L 9/3247; H04L 9/0643; H04L 2209/38; H04L 9/3239; G06Q 10/0832; G06Q 30/0185; G06Q 10/0833
USPC .......................................................... 713/176
See application file for complete search history.

(56) References Cited

U.S. PATENT DOCUMENTS

| | | | | |
|---|---|---|---|---|
| 9,940,444 | B1* | 4/2018 | Murphy | G06F 8/61 |
| 10,057,243 | B1* | 8/2018 | Kumar | H04W 8/005 |
| 2005/0132194 | A1* | 6/2005 | Ward | G07C 9/257 |
| | | | | 713/176 |
| 2007/0100701 | A1* | 5/2007 | Boccon-Gibod | H04L 63/0492 |
| | | | | 705/21 |
| 2007/0185814 | A1* | 8/2007 | Boccon-Gibod | G06F 21/10 |
| | | | | 705/51 |
| 2008/0189549 | A1* | 8/2008 | Hughes | G06F 21/10 |
| | | | | 713/171 |
| 2008/0214312 | A1* | 9/2008 | Richard | G07F 1/06 |
| | | | | 463/47 |
| 2009/0282259 | A1* | 11/2009 | Skoric | G06F 21/35 |
| | | | | 713/185 |
| 2011/0107095 | A1* | 5/2011 | Malzahn | G06F 21/10 |
| | | | | 713/168 |

(Continued)

FOREIGN PATENT DOCUMENTS

| | | |
|---|---|---|
| WO | WO2017027648 A1 | 2/2017 |
| WO | WO2017196655 A1 | 11/2017 |

*Primary Examiner* — Aravind K Moorthy
(74) *Attorney, Agent, or Firm* — Louis J. Hoffman

(57) ABSTRACT

A method of securely serializing product units to provide a trusted basis for the recording of transaction events reflecting distribution actions within and between supply chain participant vendors. The method involves receiving vendor data including vendor public data descriptive of a given product unit, generating a unique serial number to be securely associated with the given product unit, the unique serial number including a public serial number and a unique nonce, generating a cryptographic hash of the unique serial number and the vendor public data, generating a cryptographic signature of the cryptographic hash using a predetermined private key, and returning marking data including the public serial number.

13 Claims, 12 Drawing Sheets

(56) References Cited

U.S. PATENT DOCUMENTS

| | | | |
|---|---|---|---|
| 2012/0120315 A1* | 5/2012 | Shintani | G06Q 30/0251 |
| | | | 348/563 |
| 2012/0179614 A1* | 7/2012 | Tang | G06Q 30/0185 |
| | | | 705/318 |
| 2012/0179615 A1* | 7/2012 | Tang | G06Q 30/0185 |
| | | | 705/318 |
| 2014/0101731 A1* | 4/2014 | Dandu | G06F 21/44 |
| | | | 726/5 |
| 2014/0201094 A1 | 7/2014 | Herrington et al. | |
| 2015/0278487 A1 | 10/2015 | Scott | |
| 2015/0278598 A1* | 10/2015 | Scott | G06K 9/00577 |
| | | | 382/100 |
| 2016/0134621 A1* | 5/2016 | Palanigounder | H04W 12/06 |
| | | | 713/156 |
| 2016/0261565 A1* | 9/2016 | Lorenz | H04L 63/045 |
| 2016/0292680 A1* | 10/2016 | Wilson, Jr. | G06Q 20/3678 |
| 2016/0300234 A1* | 10/2016 | Moss-Pultz | G06Q 20/3827 |
| 2017/0026183 A1* | 1/2017 | Strong | H04L 9/3247 |
| 2017/0032381 A1 | 2/2017 | Stollman | |
| 2017/0048216 A1* | 2/2017 | Chow | G06Q 10/0631 |
| 2017/0060559 A1* | 3/2017 | Ye | G06F 8/65 |
| 2017/0075941 A1* | 3/2017 | Finlow-Bates | H04L 9/3239 |
| 2017/0085545 A1* | 3/2017 | Lohe | G06Q 20/389 |
| 2017/0221052 A1* | 8/2017 | Sheng | G06Q 20/3829 |
| 2017/0286717 A1* | 10/2017 | Khi | H04L 63/06 |
| 2017/0317997 A1* | 11/2017 | Smith | H04L 9/0891 |
| 2017/0338967 A1* | 11/2017 | Lewison | H04L 9/14 |
| 2018/0012311 A1* | 1/2018 | Small | B33Y 50/02 |
| 2018/0075262 A1* | 3/2018 | Auh | H04L 9/0643 |
| 2018/0088928 A1* | 3/2018 | Smith | H04L 67/34 |
| 2018/0183606 A1* | 6/2018 | High | H04L 9/3239 |
| 2018/0191503 A1* | 7/2018 | Alwar | H04L 9/14 |
| 2018/0248685 A1* | 8/2018 | O'Brien | H04W 4/46 |
| 2018/0253451 A1* | 9/2018 | Callan | G06F 16/211 |
| 2018/0254841 A1* | 9/2018 | Nannra | H04L 9/12 |
| 2019/0019183 A1* | 1/2019 | Karame | H04L 9/008 |
| 2019/0057362 A1* | 2/2019 | Wright | G06Q 20/065 |
| 2019/0081796 A1* | 3/2019 | Chow | H04L 9/30 |
| 2019/0130190 A1* | 5/2019 | Raspotnik, Jr. | H04L 9/3247 |
| 2019/0132138 A1* | 5/2019 | Finlow-Bates | H04L 63/12 |
| 2019/0141157 A1* | 5/2019 | Lebsack | H04L 43/02 |
| 2019/0190698 A1* | 6/2019 | Nuzzi | G06F 16/51 |
| 2019/0244227 A1* | 8/2019 | Inoue | H04L 63/0428 |
| 2019/0258986 A1* | 8/2019 | Nguyen | H04L 9/3297 |
| 2019/0258991 A1* | 8/2019 | Nguyen | G06F 16/182 |
| 2019/0303887 A1* | 10/2019 | Wright | G06F 16/27 |

* cited by examiner

METHODS FOR SECURE SERIALIZATION OF SUPPLY CHAIN PRODUCT UNITS

BACKGROUND OF THE INVENTION

Field of the Invention

The present invention is generally related to supply chain management systems and, in particular, to a supply chain management computer system operating to securely record transactions, descriptive of defined transactional event activities occurring within the operation of a supply chain, and reporting thereon.

Description of the Related Art

Supply chains represent a fundamental logistical mechanism for connecting manufacturers and other suppliers of goods and services with consumers. As supply chain logistics have become more complex or, at a minimum, more extenuated, various consumer-oriented interests have increased the awareness of the dangers arising from any breakdown in supply chain integrity. These dangers generally involve some misrepresentation of the source, content, or quality of consumer products and, in certain contexts, to the delivery of trustworthy services. Conventionally, these dangers arise from various forms of contamination, adulteration, and counterfeiting.

The pharmaceutical industry involves an exemplary supply chain where issues of contamination, adulteration, and counterfeiting are of particular concern. Various efforts to stem contamination, adulteration, and counterfeiting have been advanced by the pharmaceutical industry. Conventionally, these efforts have involved incremental improvements to product packaging, independent, bonded certification of source materials, manufacturers, and carriers, and increased scrutiny by law enforcement, particularly including customs authorities.

The pharmaceutical industry, like other supply chain-involved industries, has recognized that whenever a possible issue of contamination, adulteration, and counterfeiting arises, the source and cause of the issue must be tracked and analyzed. Indeed, expediently determining source and cause is often the essential first step in providing any meaningful curative remediation. Counterfeiting, specifically the injection of fraudulently manufactured and marked drugs into the pharmaceutical supply chain, currently accounts for about US$200 billion per year in direct financial losses to the industry. At the same time, counterfeit drugs represent a clear potential harm to consumers given the implicit lack of safeguards against contamination, adulteration, and fraudulent labeling. Thus, speed is also desired in tracking counterfeits. In any event, identifying and understanding source and cause is essential to preventing the issue, whatever its specific nature, from reoccurring.

Conventionally, tracking and tracing the distribution of some particular product instance through a supply chain of any significant complexity is difficult in terms of time, labor, disruption, and cost. Tracking generally refers to determining the detailed path of some product in a direction from manufacturer to consumer. Tracing generally refers to tracking in the opposite direction. Tracking can thus encompass tracing, dependent on context. The difficulty of tracking products is particularly magnified where participant vendors in the supply chain are a confederation of independent competitors implementing wholly disparate inventory and supply chain management control systems. The transfer of vendor information necessary to follow a product from one vendor to another, potentially subject to various forms of transformation, is impeded by the required vendor data conversion and complicated by each vendor's implicit need to protect proprietary information. In typical response to a tracking request, a vendor extracts an information database for transfer to an adjacent supply chain vendor. The receiving vendor must then convert and load the database as necessary to continue tracking the product. This process is typically repeated through multiple respectively adjacent supply chain vendors as necessary to finally identify not only the source and cause of some particular contamination, adulteration, or counterfeiting issue, but also the current location of all affected products.

Specifically with regard to the pharmaceutical industry, various national governments have begun efforts to streamline the problem of tracking and tracing of goods through the supply chain. In the United States, the Drug Supply Chain Security Act (DSCSA) was enacted into law by the US Congress to require supply chain participant vendors to build an electronic, interoperable system that will allow the tracking of uniquely marked prescription drugs and certain other medical devices whenever they are distributed within the United States. The DSCSA requires, subject to phased-in implementation, lot-level management, unit serialization, and unit traceability. Lot-level management requires the interoperable ability to share transaction information, history information, and statements at the lot or batch level of product unit identification. Item serialization requires manufacturing and repackaging vendors to mark packages of drug products using a product identifier (GS1 Global Trade Item Number® (GTIN®) or NDC (National Drug Code)), serial number, lot number, and expiration date. Unit traceability requires all supply chain participant vendors to make available information that would allow other supply chain participant vendors to trace ownership of some particular unit package back to an initial manufacturer or repackager. Similar legal requirements now also exist in at least Europe, China, and Japan.

Various public and private companies and research groups are promoting and assisting in understanding the complexities of different approaches to implementing systems that will eventually meet the requirements of the DSCSA and the other similar national laws. In general, these implementations rely on some standardized data interchange format, while otherwise being wholly proprietary developments of typically major independent supply chain vendors. As the DSCSA is conventionally interpreted, the data interchange format must be capable of transferring transaction information records that define (A) the proprietary or established name or names of the product; (B) the strength and dosage form of the product; (C) the National Drug Code number of the product; (D) the container size; (E) the number of containers; (F) the lot number of the product; (G) the date of the transaction; (H) the date of the shipment, if more than 24 hours after the date of the transaction; (I) the business name and address of the entity from whom ownership is being transferred; and (J) the business name and address of the entity to whom ownership is being transferred.

Perhaps the primary proposed data interchange format is the GS1 Standard for Electronic Product Code Information Services (EPCIS; www.gs1.org/epcis). In application, EPCIS defines the protocols for creating and sharing visible event data for use both within and across enterprise supply chain vendors to allow a shared view of digitally represented physical objects within the relevant supply chain context. Ideally then, the common use of EPCIS by all vendors involved in a supply chain allows traceable transactional information to be shared up and down the supply chain as necessary to facilitate the tracking of some given unit instance of a product.

While EPCIS may solve some of the current electronic data interchange problems, many others remain. One recognized problem concerns securing the proprietary vendor data potentially exchanged by and between the many different supply chain participant vendors. Of particular concern, vendors will be sharing their own transactional information as well as transactional information provided by others to them. Consequently, limiting what information can be shared with which vendors and by which vendors is complex.

The Center for Supply Chain Studies (CSCS; www.c4scs.org), operating as a nonprofit, vendor-neutral, open industry forum, is coordinating studies intended to address the DSCSA related security problems. The primary challenges identified include (1) establishing secure electronic communications between supply chain vendors; (2) establishing secure trust relations between these supply chain vendors; and (3) securing the sharing of required data between supply chain vendors without exposing proprietary information.

The approaches to solving these challenges evidently considered in the CSCS studies involve using a blockchain distributed ledger to record EPCIS data. A rule-based system is proposed to qualify the sufficiency of EPCIS data to be added to the blockchain and, possibly, to define what EPCIS data can be viewed by any particular supply chain vendor. This implementation model appears to require significant integration with the supply chain vendor systems to reach the transaction data necessary to actually tracking some given unit instance of a product. Unfortunately, requiring any such significant integration, particularly with proprietary supply chain vendor systems, will fundamentally detract from the ability to expediently perform product unit tracking and tracing. Further, while many specific aspects of speculative implementations may have been discussed within the scope of the CSCS studies, no implementation has apparently been created.

Consequently, a continuing need exists for effective, efficient, and expedient mechanisms that can protect the integrity of supply chains and thereby safeguard the interests and health of consumers.

SUMMARY OF THE INVENTION

Thus, a general purpose of the present invention is to provide an efficient and secure system supporting the serialization of products and the recording of the transaction history thereof as transferred within and between the participant vendors, including consumers, of a supply chain.

This is achieved in the present invention by providing a networked computer system that manages the collection, secure recording, and reporting of supply chain transactions within and between independent supply chain participants, including consumers. The system includes a platform controller, responsive to transaction requests from supply chain participants, that directs, subject to participant access verification, the creation of a blockchain record by a secure distributed ledger server node, where the blockchain record includes a supply chain unit unique serial number, a timestamp, transaction event data referencing a location, and private supply chain participant vendor data. An access manager operates to perform participant access verification by securely verifying the identity of the supply chain participant making the transaction request.

An advantage of the present invention is that the confederation of vendors participating in a supply chain can independently interact with the networked transaction management system to obtain serialization services, to record unique unit transactions, reflecting well-defined events occurring within and between vendors, in a secure distributed ledger, and to track and trace the location and movement of units, including the repackaging thereof, throughout the supply chain.

Another advantage of the present invention is a secure trust mechanism is provided to securely authenticate the participant vendors who issue requests to the networked transaction management system and to conditionally constrain the handling of such requests dependent on the rights of the authenticated credentials.

A further advantage of the present invention is that serialization related public data and vendor private data provided in conjunction with a serialization request can be securely and efficiently persisted for later access in response to inquiry requests. The public and private data is preferably stored in a secure, distributed repository to ensure long-term, reliable access and permit reference from related transactional event records stored in a secure distributed ledger.

Still another advantage of the present invention is that well-defined transactions, representing discrete events in the transactional history of unique serialized units, are recorded in a secure distributed ledger. A concise vocabulary is used to command the storage of transaction records that are optimally structured for persistence to the secure distributed ledger. An additional inquiry vocabulary command enables retrieval of related transaction records to obtain reconstruction of the transactional history of command identified unique serialized units. This vocabulary is separate from, yet adaptable to, a vendor data interchange format used to exchange information regarding transactional events between any of the supply chain participants and the networked transaction management system.

Yet another advantage of the present invention is that the tracking and tracing of unique serialized units, particularly where subject to repackaging events, can be performed without involving any of the participant vendors. This allows any properly authorized entity to immediately examine the transactional event history of unique serialized units, while fully protecting the confidentiality of any vendor private data that may be associated with the unique serialized units. Manual and automated reviews of transaction histories can immediately identify discontinuities indicative of counterfeiting or tampering.

BRIEF DESCRIPTION OF THE DRAWINGS

The present invention may be better understood by reference to the following description of the preferred embodiments and the accompanying drawings, wherein like reference numerals indicate the same or functionally similar elements, and wherein.

DETAILED DESCRIPTION OF THE INVENTION

The present invention is preferably implemented as a networked supply chain management system enabling the secure recording of transactional events within and between a confederation of typically independent supply chain vendor participants, including manufacturers, wholesalers, distributors, carriers, dispensers, retailers, consumers, and others. Selections of the transactional records preferably permit tracking and tracing of specific unit assets through the supply chain. For purposes of the present invention, supply chain unit assets are typically goods that represent a product, or a part thereof, ultimately intended for customer consumption. Within the operation of a supply chain, these units are the objects of transactional events describing, in general terms, the creation, movement, modification, repackaging, and consumption of identifiable unit assets.

Figure 1:
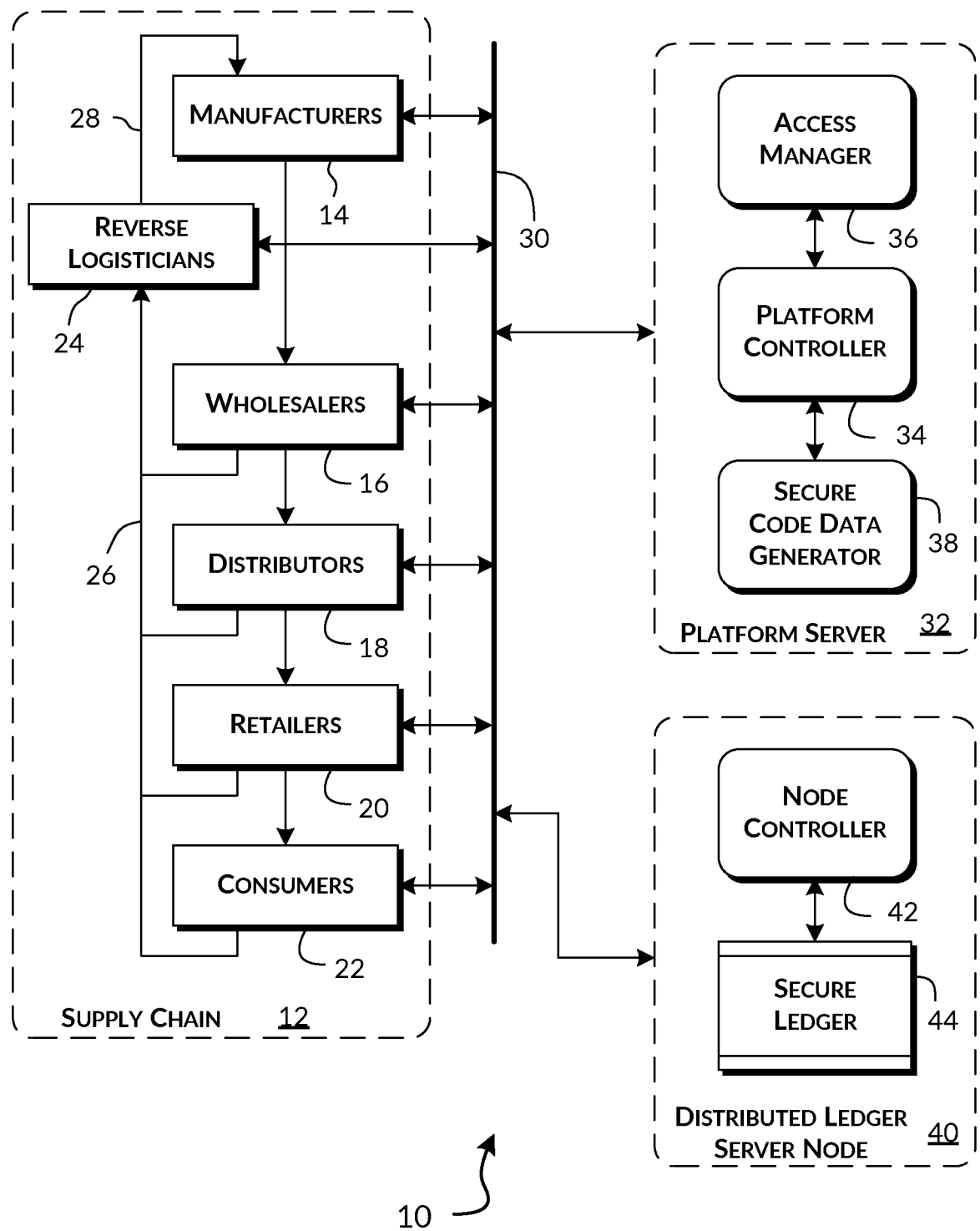
FIG. 1 illustrates the operational association of participant vendors within a supply chain with a platform server embodiment of the present invention.

FIG. 1 illustrates a preferred operating environment 10 of the preferred embodiments of the present invention. An exemplary supply chain 12 includes a confederation of participants vendors that interoperate to deliver products from manufacturers 14 through wholesalers 16, distributors 18, and retailers 20, in various combination, to consumers 22. The supply chain 12 also includes reverse logisticians 24 that operate to collect 26 unused, excess, expired, and defective products for refurbishment, resale, and destruction 28, dependent on context. Furthermore, consumers 22 may function as manufacturers 14, wholesalers 16, distributors 18, and retailers 20 within the context of a larger or adjunct connected supply chain 12. This most typically occurs where supply chain assets received by a consumer 22 are incorporated or otherwise consumed in the manufacture or assembly of some new product. For purposes of the present invention, elements of supply chain assets are discrete product units marked with unique product identifiers. In the preferred embodiments of the present invention, these unique product identifiers are serial numbers.

Operation of the supply chain 12 characteristically results in the occurrence of transactional events on or otherwise involving supply chain assets. For purposes of the present invention, these transactional events are preferably defined in terms of a small, concise set of functional operations on information representing essential aspects of the real-world operation of the supply chain 12. Preferably, the functional operations are categorized as terminal, transfer, aggregation, and inquiry operations occurring against one or more serial number identified product units. In a preferred embodiment of the present invention, these functional operations are specified by the following minimal set of functions, using a pseudo-code representation.

Terminal Operations:

```
create( S/N, by vendor, at location,
    with public_data [, secure_private_data]
)
destroy( S/N [, S/N, ...], by vendor, at location )
```

Transfer Operations:

```
move( S/N, to location [from vendor | carrier] )
move( S/N, to vendor [via carrier])
```

Aggregate Operations:

```
split( S/N to S/N [, S/N, ...] )
combine( S/N [, S/N, ...] as S/N )
change( S/N to S/N )
```

Inquiry Operations:

```
query( [S/N, ..., ] [hash, ..., ]
    [vendor, ] [ carrier, ] [location, ]
    [vendor | location [to vendor | location] ]
    [date_time [to date_time] ]
)
```

While the set of functional operations may be expanded, the set is preferably constrained to concisely describe the atomic aspects of transactional events. Compound functional operations may be added to simplify use in the case of frequently occurring atomic sequences, such as Create-Move, Create-Split, and Move-Destroy. For a compound functional operation, the parameter data provided is equivalent to the parameter data of the incorporated atomic functional operations. As will be described in greater detail below, the ability to efficiently capture the transaction histories of the various product units moving through a supply chain 12 and thereafter track discrete units is particularly enhanced by the use of a concise set of functional operations.

Preferably, each of the participant vendors 14, 16, 18, 20, 22, 24 can independently connect through a public network 30, such as the Internet, to a platform server 32 implementing a transactional manager constructed in accordance with a preferred embodiment of the present invention. In general, communications and the execution of requests presented thereby are handled by a platform controller 34, subject to authentication and access control supervision by an access manager 36. For product unit serialization requests, the platform controller 34 involves a secure code data generator 38 to obtain new, unique serial numbers. For vendor 14, 16, 18, 20, 22, 24 requests involving the recording or reporting of supply chain transactional events, the platform server 32 preferably interoperates with a distributed ledger server node 40, containing a node controller 42 and secure distributed ledger 44, to store and retrieve securely persisted transactional event records. The secure distributed ledger 44 is preferably implemented using a blockchain-based security technology.

Figure 2:
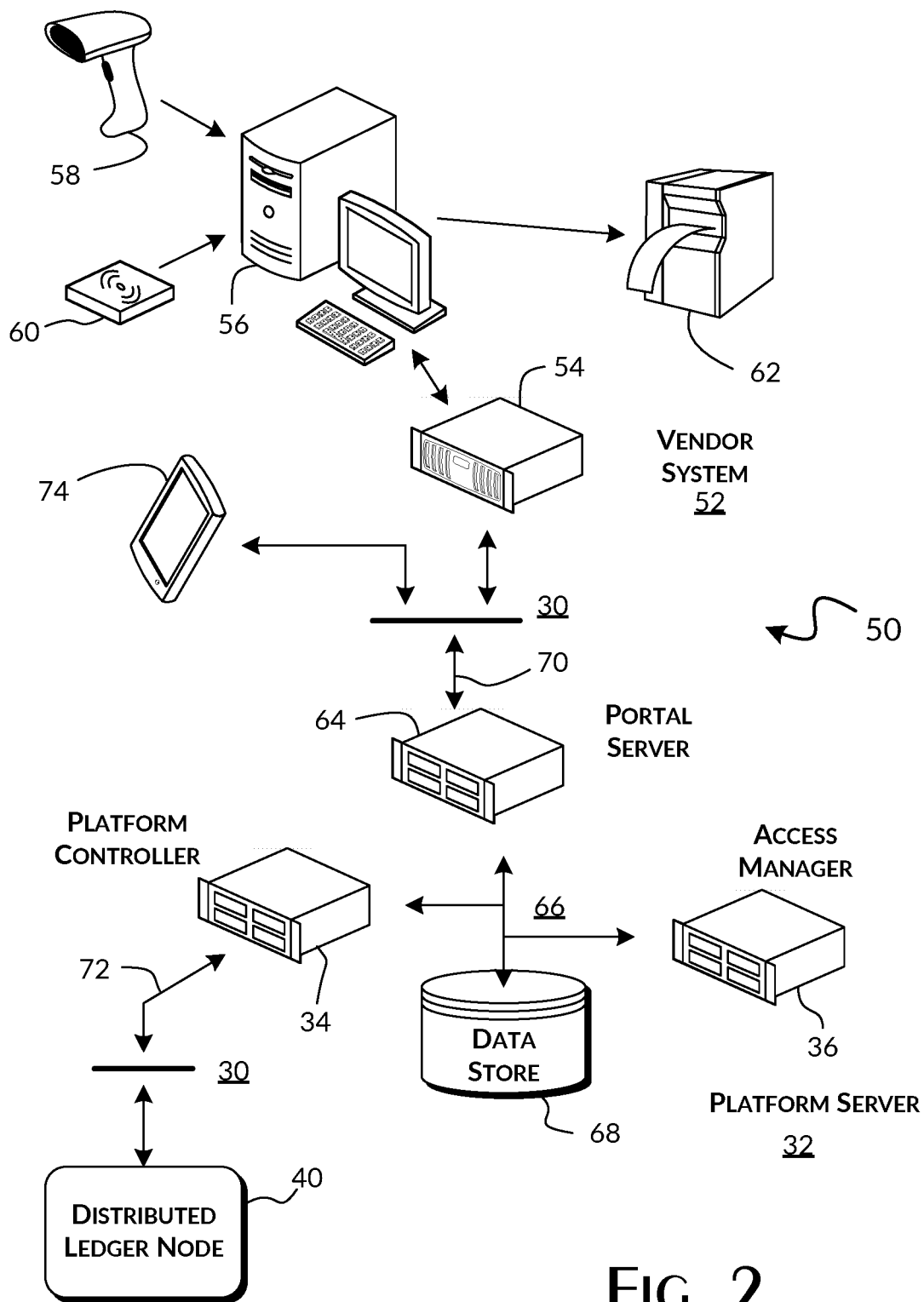
FIG. 2 is a representational diagram of a vendor system and a preferred implementation of a platform server embodiment of the present invention.

FIG. 2 illustrates 50 an exemplary implementation of a vendor system 52, as may be implemented by a manufacturer 14, wholesaler 16, distributor 18, retailer 20, consumer 22, or reverse logistician 24, and a preferred implementation of a platform server 32 constructed in accordance with the present invention. As shown, the vendor system 52 includes a system controller 54 networked with one or more user terminals 56. These user terminals 56 are typically distributed at various points within a vendor facility, including receiving, production, shipping, and consumer service areas. Optical scanners 58 and RFID and near field receivers 60, in addition to other data entry devices, are used to capture product unit information, specifically including serial numbers. Select user terminals 56 are provided with label printers 62 and other marking devices and technologies, including RFID and NFC writers, that allow application of serial numbers to product units.

The platform server 32, as preferably constructed, includes a portal server 64 that operates as the vendor-oriented interface to the network 30. An internal network 66 connects the portal server 64 with the platform controller 34, the access manager 36, and a data store server 68. In the preferred embodiments, the portal server 64 executes a Web server further implementing one or more web services that enables the various vendor systems 52 to send transactional event information and receive transaction histories. These send and receive requests are termed vendor protocol requests 70 for purposes of the present invention. The portal server 64, operating in conjunction with the platform controller 34, is able to accept transactional event information in any of a number of well-defined data exchange formats. This allows the platform server 32 the flexibility to interoperate with disparately implemented vendor systems 52. The preferred vendor protocol data exchange format is EPCIS. The web services preferably implement REST, SOAP, and other similar communication protocols as appropriate to the needs of the disparately implemented vendor systems 52.

Vendor protocol requests 70 are routed to the platform controller 34 and subjected to authentication and access rights supervision by the access manager 36. When and as permitted, the platform controller 34 then further executes the vendor protocol requests 70 by issuing a series of one or more functional operation requests 72 to the distributed ledger node 40. Where a vendor protocol request 70 provides a data exchange formatted description of a transactional event, the platform controller 34 extracts and converts essential transactional event information and generates the necessary functional operation requests 72 to obtain secure storage by the distributed ledger node 40. For vendor protocol requests 70 for transaction histories, the platform controller 34 generates the functional operation requests 72 to retrieve the request corresponding collection of previously stored essential transactional event information. The platform controller 34 then converts and assembles the retrieved transactional event information into a responsive transaction history further formatted into the appropriate vendor protocol data exchange format for reply to the vendor protocol request 70.

In preferred embodiments of the present invention, vendor protocol requests 70 can be also issued from an application executed by most any networked computing device 74, including phone, tablet and personal computers. Minimally, execution of a Web browser permits use of a Web application hosted by the portal server 64 to interface with the co-hosted web services. For mobile phones and tablets, particularly where used by supply chain end consumers 22, the device 74 local execution of a mobile app preferably operates to simplify interactions with the portal server 64 web service.

Figure 3A:
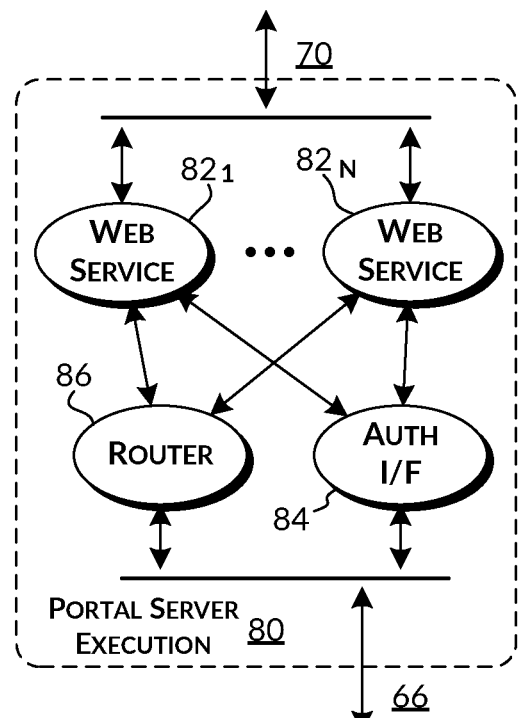
FIGS. 3A, 3B, and 3C provide block diagrams of the preferred execution environments as implemented by the portal, access manger, and platform controller servers of a preferred embodiment of the present invention.

A preferred execution context 80 of the portal server 62 is shown in FIG. 3A. Within the execution context 80, web services $82_{1-N}$ operate to receive vendor protocol request messages and return corresponding vendor protocol replies 70. Preferably, each web service $82_{1-N}$ supports some combination of a data transport protocol, such as REST and SOAP, and a data interchange format capable of describing process and physical elements, such as EPCIS and other physical markup languages as well as XML and other general purpose markup languages. This gives the protocol server 62 the flexibility to support any specific communications requirement of the disparate vendor systems 52.

In the preferred embodiments, the web services $82_{1-N}$ authenticate vendor protocol request messages as received. Vendor identification and authorization data extracted from a vendor protocol request message is sent through an authentication interface 84 to the access manager 36 for evaluation. Where authentication is successful, the data content of a vendor protocol request message is sent through a router 86 to the platform controller 34. Data content constituting a reply is received through the router 86, corresponding web service $82_{1-N}$ to produce an appropriate vendor protocol reply message, and returned to the correct one of the vendor systems 52.

Figure 3B:
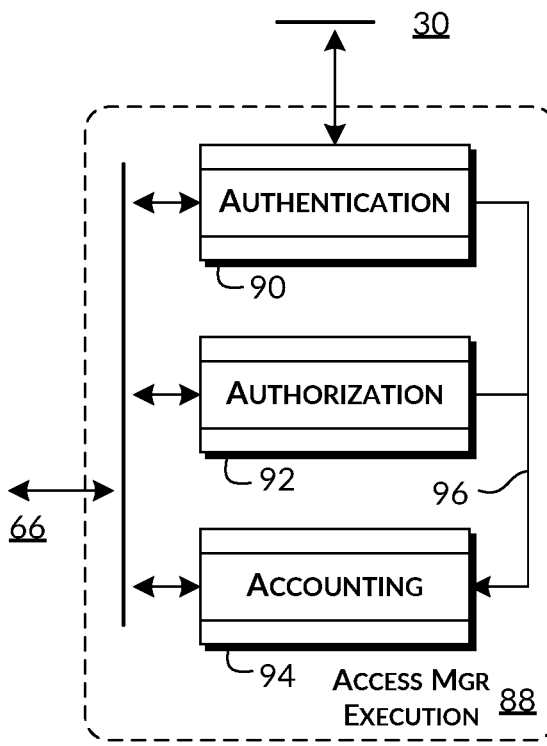

FIG. 3B illustrates the preferred execution context 88 of the access manager 36. An authentication engine 90 executes to authenticate vendor credentials exchanged through the internal network 66 and the portal server 64 with a vendor system 52. As needed, the authentication engine 90 can access remote security resources via the network 30. The authentication engine 90 preferably implements the Simple Authentication and Security Layer (SASL) framework to enable use of a variety of cryptographically secure authentication protocols, including for example the OpenID and OAuth protocols. An authorization engine 92 executes to determine the access privileges and operative role rights available through an authenticated connection with a particular vendor system 52. These privileges and operative role rights are determined from information records persisted by the data store server 68. In the preferred embodiments, the authorization engine 92 implements a network directory services protocol, such as LDAP. An accounting engine 94 preferably executes to specifically monitor 96 the events occurring within the operation of the authentication and authorization engines 90, 92. The accounting engine 94 may also monitor operational events emitted by the portal and platform controller servers 64, 34 that reflect their ongoing internal operation. Accounting events are persisted as data records by the data store server 68.

Figure 3C:
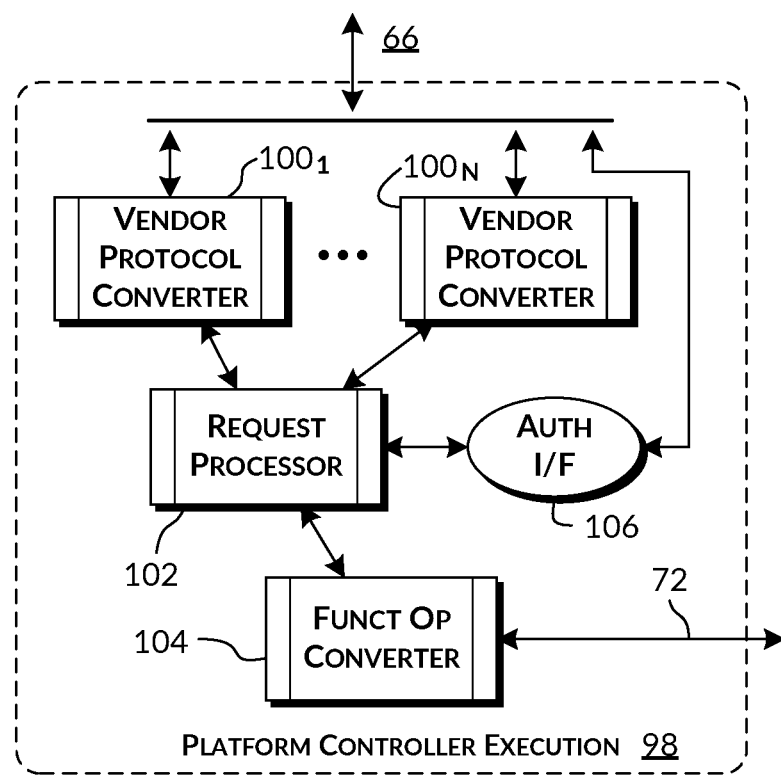

The preferred execution context 98 of the platform controller 34 is shown in FIG. 3C. A set of vendor protocol converters 100$_{1-N}$ are arrayed to exchange vendor protocol request and reply messages with the protocol server 64 via the internal network 66. Each of the vendor protocol converters 100$_{1-N}$ preferably implements a bidirectional format conversion process between one of the supported data interchange formats and an internal neutral data format used by the platform controller 34. The vendor protocol converters 100$_{1-N}$ are preferably selected by the router 86 based on the data interchange format type of a vendor protocol request message.

A request processor 102 evaluates each vendor protocol message, as rendered in the internal neutral data format, as necessary to determine and direct execution of one or more functional operations. In connection with this evaluation, the request processor 102 will access the authorization engine 92 via an authorization interface 106 to qualify the execution the functional operations. The qualified directions coupled with appropriate selections of data as provided in the internal neutral data format are then applied to a functional operation converter 104. The functional operation converter 104 is responsible for exchanging appropriately formatted functional operation requests and replies 72 with the distributed ledger node 40.

Figure 4:
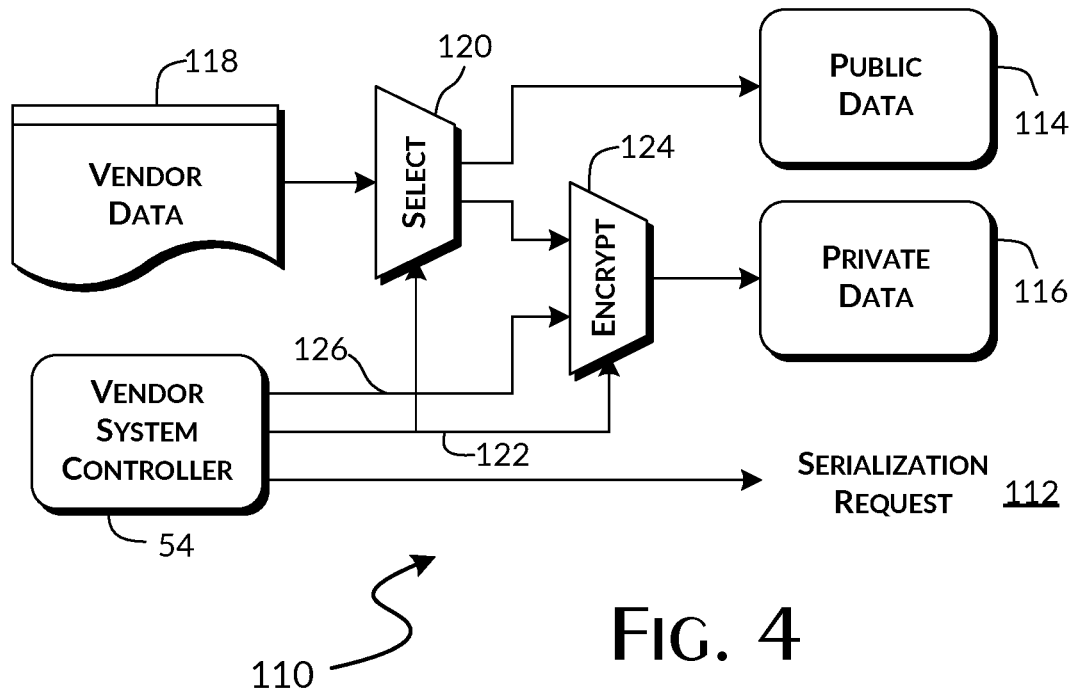
FIG. 4 provides a block diagram of a preferred serialization request generation subsystem as implemented in a vendor system for use in conjunction with the present invention.

FIG. 4 shows a vendor serialization request subsystem 110 used in conjunction with preferred embodiments of the present invention. The serialization request subsystem 110 is implemented as an executable operation by those vendor systems 52 that functionally create, aggregate, or otherwise transform product units within the supply chain 12. Typically, a vendor system controller 54 will issue a serialization request 112 in advance of or otherwise in conjunction with the creation of new serializable product units or the aggregation of existing product units into one or more new serializable product units. Issuing a serialization request 112 nominally results in the vendor system controller 54 receiving serial numbers for use in marking the new serializable product units. The serial numbers received are either automatically generated by the platform controller 34 or based on a proposed serial number provided with the serialization request 112.

Preferably, a serialization request 112 includes public 114 and private 116 data when issued to the platform server 32. Public data 114 is typically derived from a vendor data store 118 present within the vendor system 52. Information descriptive of a new serializable product unit is selected 120 from the vendor data store 118 for presentation as the public data 114 under the control 122 of the vendor system controller 54. The selected public data 114 nominally includes whatever information is to be used in the visible or otherwise plain text optically or electronically readable marking that will be applied to a new serializable product unit. In the exemplary case of pharmaceutical product unit markings, the public data 114 will preferably include the NDC and equivalent GTIN numbers, a vendor lot number, and the product unit expiration date, as well as, where appropriate, vendor, location, prescriber, and dispenser name, prescription and dispensing dates, prescription number, and quantity and concentration values. The public data 114 is preferably formatted into the corresponding fields of a well-defined data interchange format, typically as chosen by the vendor system 54.

The information content of the private data 116 is also selected 120 from the vendor data store 118. The information selected typically represents confidential or otherwise proprietary vendor information that the vendor desires to specifically associate with a serialized product unit, yet protect from examination by other vendors or interested entities. In the exemplary case of pharmaceutical product unit markings, the private data 116 may include internal sub-lot identifiers, batch size, and other identifications of the internal processes, parameters, and materials used in unit manufacturing. Selection of any information for inclusion as the private data 116 is optional at the discretion of the vendor. Where information is selected, a vendor encryption unit 124 receives this information and a vendor encryption key 126. The resulting encoded information is the private data 116. The private data 116 is preferably stored as a binary string in a custom labeled adjunct field of the well-defined data interchange format.

Figure 5:
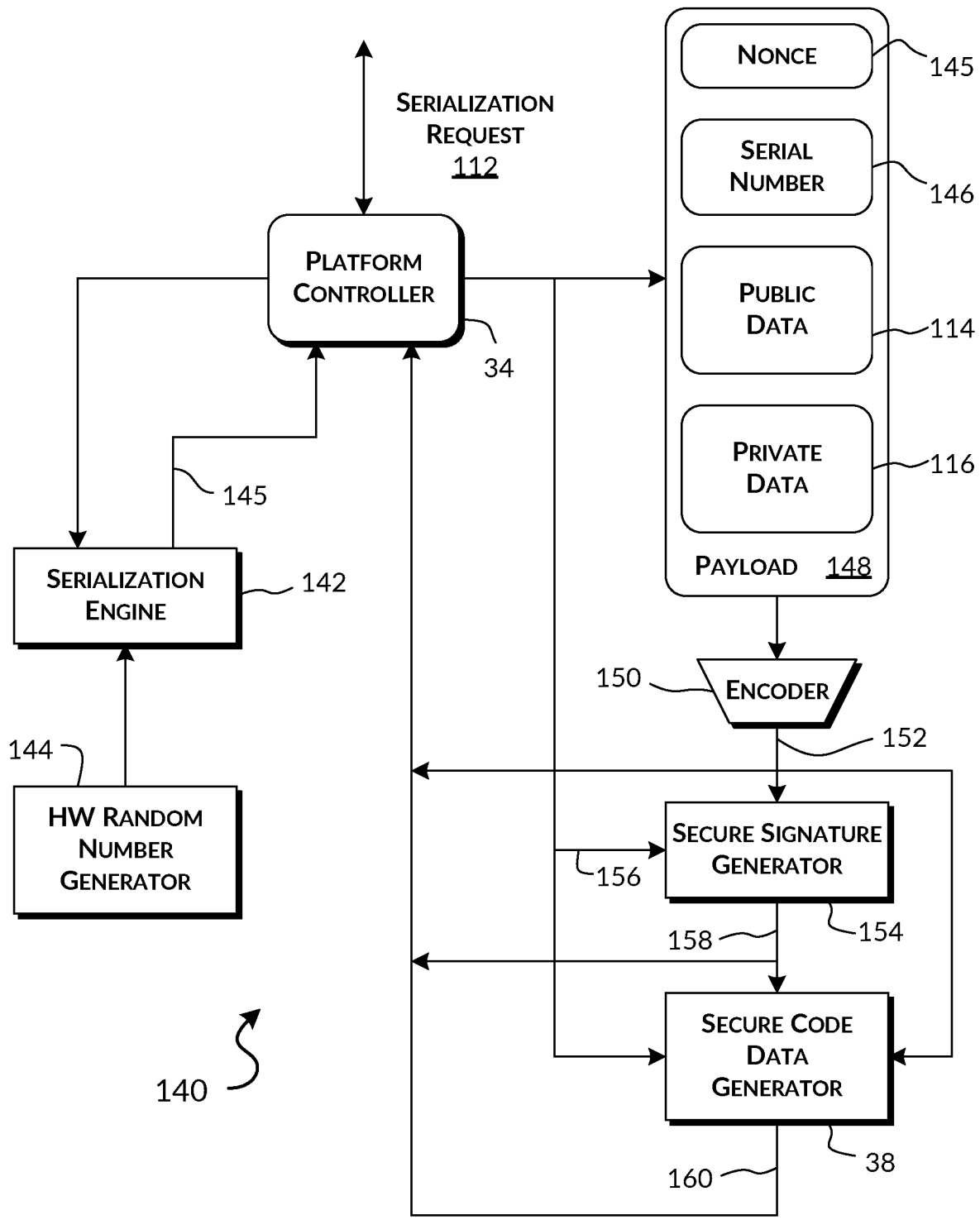
FIG. 5 provides a block diagram of a preferred implementation of the platform server serialization request handling system of the present invention.

Referring to FIG. 5, vendor serialization requests 112, as processed through the portal server 64, are preferably handled by a serialization subsystem 140 of the platform controller 34. In the preferred embodiments of the present invention, the platform controller 34 implements a software serialization engine 142 and hardware random number generator 144. The serialization engine 142 preferably functions to render the random numbers provided by the random number generator 144 within a predefined format typically characterized as having a defined string length and symbol set. Each call on the serialization engine 142 thus returns a properly formatted, unique nonce value 145 to the platform controller 34. Where a vendor serialization request 112 provides a proposed serial number, the nonce value 145 and proposed serial number, as serial number 146, are incorporated into a message payload 148. In the absence of a proposed serial number, the platform controller 34 preferably derives the serial number 146 from the nonce value 145. The message payload 148 also incorporates the public data 114 and private data 116, as obtained in conjunction with the serialization request 112. The message payload 148 is then processed through an encoder 150 implementing a cryptographic hash function, such as MD5, SHA-1, or SHA-2, to obtain a secure hash digest value 152. A 256-bit SHA-2 cryptographic hash function is presently preferred for pharmaceutical supply chain 12 applications. The preferred algorithm implemented by the encoder 150 to produce the hash digest value 152 is summarized as follows:

Private_Hash=encode(private_data)

Hash 152=encode(S/N, nonce, public_data, Private_Hash)

The generated secure hash digest value 152 is provided to both the platform controller 34 and a secure signature generator 154. The private hash is also provided to the platform controller 34. The private encryption key 156 of the platform server 32 is provided by the platform controller 34 to the secure signal signature generator 154. The secure signature 158 generated by the secure signature generator 154 is returned to the platform controller 34. The preferred algorithm implemented by the secure signature generator 154 is summarized as follows:

Signature 158=sign(Hash, private_key)

The secure code data generator 38 receives the secure hash digest value 152, including private data hash value, secure signature 158, and both the public data 114 and serial number 148 from the platform controller 34. In response, the secure code data generator 38 produces a serialization data message 160 containing the supplied information and an encoded representation thereof suitable for reproduction as an optically readable barcode or electronically readable tag. The serialization data message 160 is returned to the platform controller 34 for use in constructing the vendor protocol data exchange formatted reply to the serialization request 112. The preferred algorithm for generating the serialization data message 160 is summarized as follows:

Message 160=generate(Signature, Hash, S/N, nonce, public_data, Private_Hash)

Where private data 116 is not provided by the vendor system 52 s part of the serialization request 112, the correspondingly modified algorithm as preferably implemented by the serialization subsystem 110 is summarized as follows:

Hash 152=encode(S/N, nonce, public_data)
Signature 158=sign(Hash, private_key)
Message 160=generate(Signature, Hash, S/N, nonce, public_data)

Figure 6:
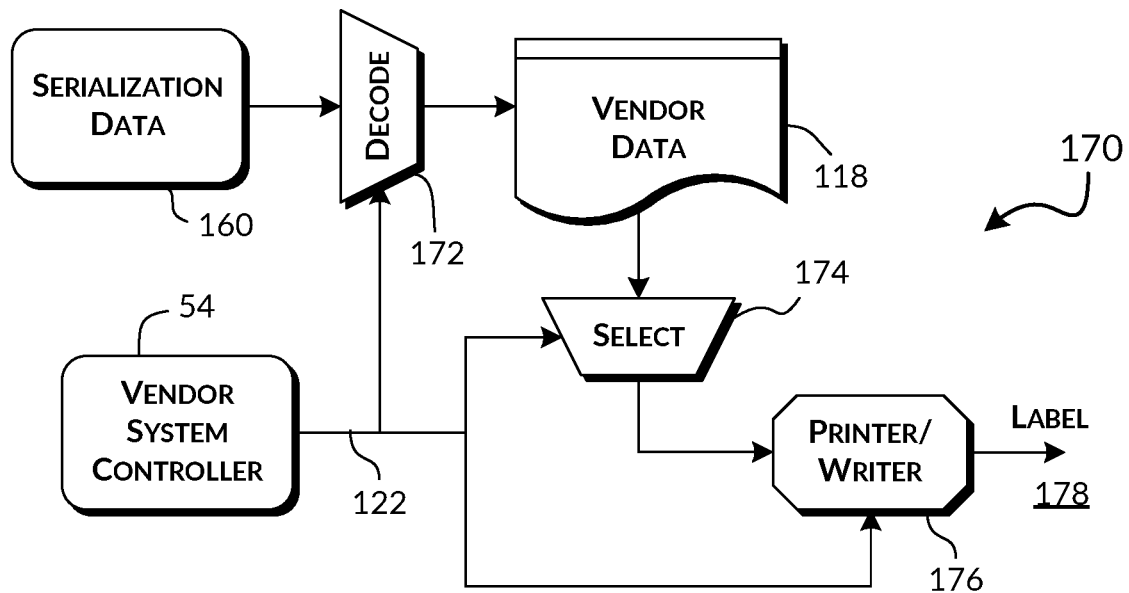
FIG. 6 provides a block diagram of a preferred serialization request receipt and label printing subsystem as implemented in a vendor system for use in conjunction with the present invention.

FIG. 6 shows the serialization reply handling subsystem 170 used by vendor systems 52 in conjunction with preferred embodiments of the present invention. The formatted serialization message data 160 is returned within the vendor protocol data exchange formatted reply to the serialization request 112. The serialization data message 160 is decoded by a vendor protocol data exchange format decoder 172 under the control 122 of the vendor control system 54. The decoder 172 typically renders the various fields of the serialization data message 160 into the vendor specific fields appropriate for the storage within the vendor data store 118. At any subsequent point in time, the vendor system controller 54 can determine to apply the informational content of the serialization data message 160 to a corresponding product unit. Data from fields within the vendor data store 118 are selected 174 and supplied to a suitable label printer or RFID/NFC writer 176 for the production of an optically or electronically readable label or tag 178.

Figure 7:
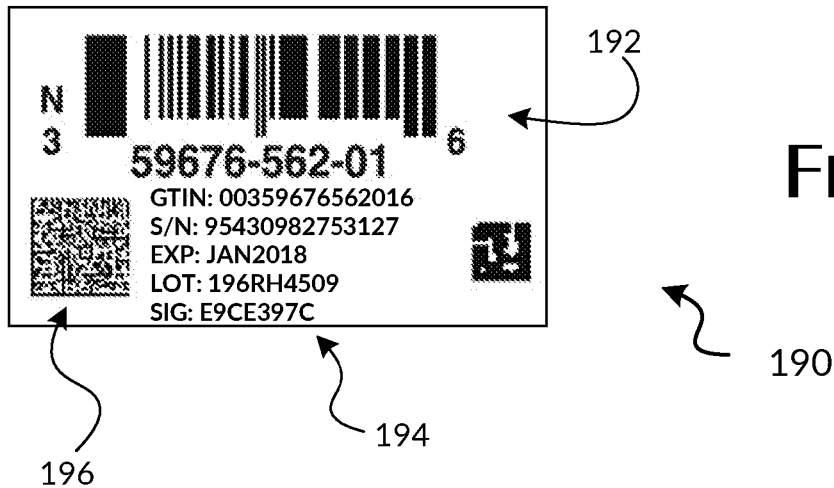
FIG. 7 is an image view of an exemplary label instance generated in accordance with the present invention.

In an exemplary pharmaceutical supply chain 12 application, labels 178 are commonly applied to physically packaged product units. As shown in FIG. 7, an optically readable label 190 appropriate for use in pharmaceutical supply chains 12 includes a barcode and numeric equivalent NDC 192. A supplemental public information block 194 provides, in clear-text, a selection of the public data 114. As shown, supplemental public information block 194 provides the NDC corresponding GTIN code, the assigned serial number 146, an expiration date, and vendor lot number. Preferably, the supplemental public information block 194 also includes a signature summary, represented by the last eight hexadecimal digits of the signature 158. Finally, the optically readable label 190 also includes a QR code 196 preferably produced from QR code data generated by the secure code data generator 38 and included in the serialization data 160. This QR code data preferably encodes the secure hash digest value 152 as well as any associated private data hash digest value, the secure signature 158, and both the public data 114 and serial number 148.

Figure 8:
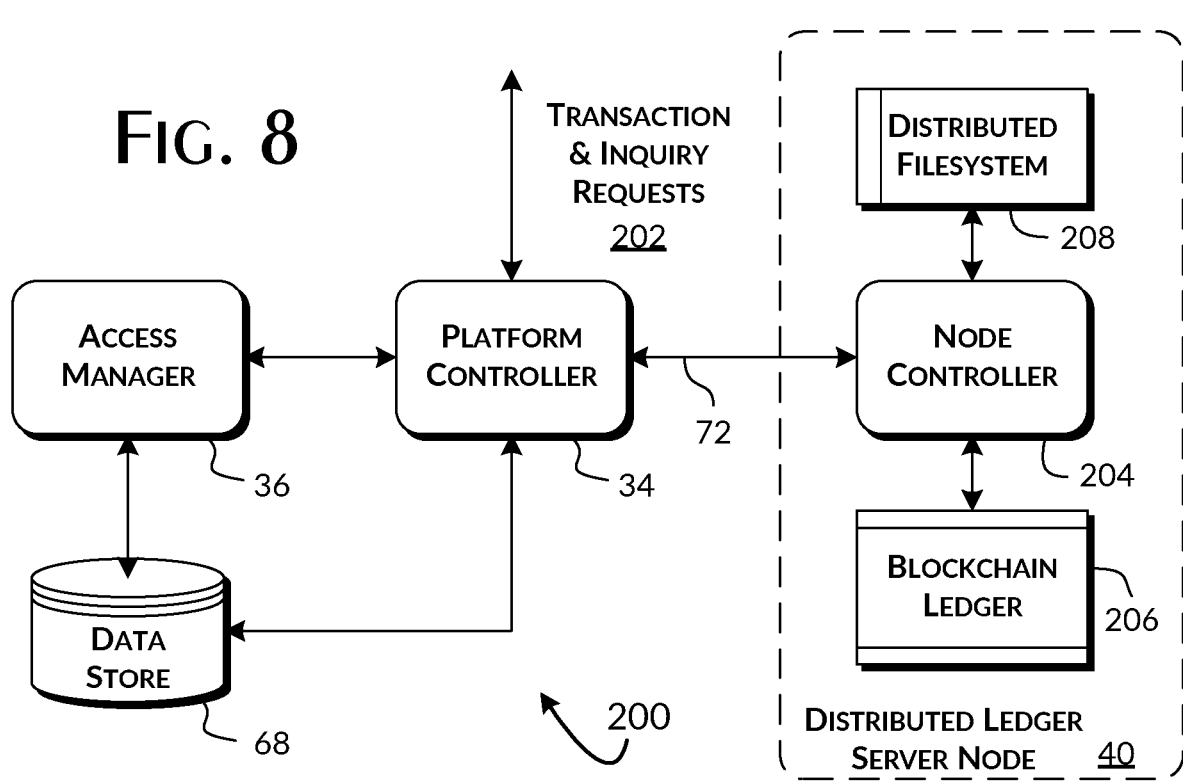
FIG. 8 provides a block diagram of a preferred implementation of the platform server access, inquiry, and transaction request handling system of the present invention.

In accordance with the present invention, vendor protocol requests 70 reporting transactional events and submitting inquires for transactional event histories and related information are preferably processed through the portal server 64 for handling by the platform controller 34. As illustrated in FIG. 8, a vendor events subsystem 200 handles transaction and inquiry requests 202 including returning replies thereto. For each transaction or inquiry request 202 received, the platform controller 34 issues a series of one or more functional operation requests 72 to the distributed ledger server node 40.

In connection with the preferred embodiments of the present invention, the distributed ledger server node 40 preferably includes a node controller 204, a secure, blockchain-based distributed ledger 206 and a secure distributed filesystem 208. The blockchain ledger 206 represents a local copy of a global blockchain ledger shared among a number of mutually participating distributed ledger server nodes 40. The contents of the blockchain ledger 206 are resolved to identity with the other copies of the global blockchain ledger through operation of a secure, distributed blockchain consensus protocol. The distributed filesystem 208 provides the node controller 204 with access to persistent data shared with the other mutually participating distributed ledger server nodes 40. Typically, the distributed filesystem 208 is implemented by an instance of an InterPlanetary Filesystem (IPFS) that connects to the IPFS 208 stores of other distributed ledger server nodes 40 through a secure, content-addressable, peer-to-peer hypermedia distribution protocol.

Figure 9:
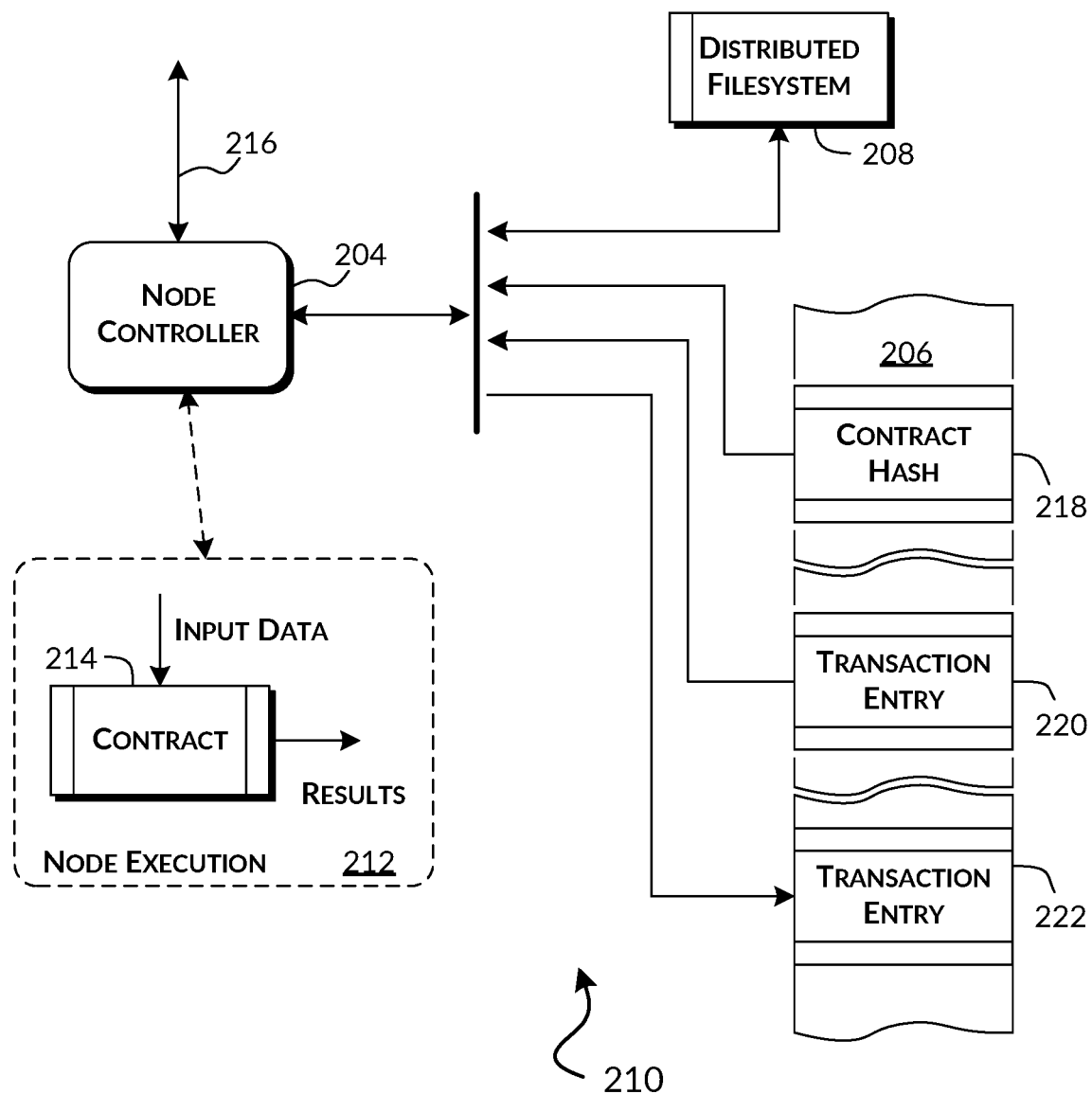
FIG. 9 is a block diagram of a secure, distributed ledger node as implemented in accordance with a preferred embodiment of the present invention.

Referring to FIG. 9, the operating environment 210 of the node controller 204 within a distributed ledger node 40 provides a secure context 212 for the execution of blockchain smart contracts. In the preferred embodiments of the present invention, a transactional contract 214 is selected and executed in response to the transaction or inquiry functional operation requests 216 issued by the platform controller 34. Each functional operation request 216 specifies a function selected from the concise set of functional operations 72 and supplies input data appropriate for the execution of the transactional contract 214 to implement the specified function. The executable instance of the transactional contract 214 is preferably retrieved directly or indirectly from the blockchain ledger 206. A prior blockchain-standard request issued to the node controller 204 will have provided the transactional contract 214 for storage. A source copy of the transactional contract 214 may be stored directly on the block chain 206. Alternately, a cryptographic hash 218 corresponding to the transactional contract 214 is stored on the blockchain 206 while the source copy of the transactional contract 214 is stored in the distributed filesystem 208, subject to selection using the cryptographic hash 218 as an index key. By having the cryptographic hash 218 encoded within each functional operation request 216, the node controller 204 can validate the provided hash value against that stored by the blockchain 206. Where valid, the cryptographic hash 218 can then be used to retrieve an executable instance of the transactional contract 214.

Execution of the transactional contract 214 instance is specifically dependent on the function specified and input data provided with a functional operation request 216. Execution preferably results in the reading of one or more existing transactional event entries 220, potentially in conjunction with reading related data from the distributed filesystem 208, the writing of a transactional event entry 222 to the blockchain 206, potentially in conjunction with the writing of related data to the distributed filesystem 208, or some combination thereof. In addition, execution status information and, dependent on the function specified, information retrieved from the blockchain ledger 206, the distributed filesystem 208, or both, is returned by the node controller 204 in reply to a transaction or inquiry functional operation request 216.

An exemplary series of functional operation requests 216 is provided in Table 1 to illustrate the use of the preferred concise set of functional operations.

TABLE 1

Exemplary Representation of Functional
Operation Requests Resulting in Distributed Ledger Entries

| | |
|---|---|
| Time 1: | create( S/N-1, Hash-1 by Vend1 at Loc1 with PublicData-1, SecurePrivateData-1 ) |
| Time 2: | .... |
| Time 3: | create( S/N-N, Hash-N by Vend1 at Loc1 with PublicData-N, SecurePrivateData-N ) Vendor 1 has created and marked N new individually serialized product units at a defined location; the size of each packaged unit, in terms appropriate for the unit contents, is included in PublicData-*; Vendor 1 proprietary information specific to unit S/N-* is provided in SecurePrivateData-* |
| Time 4: | create( S/N-CA, Hash-CA by Vend1 at Loc1 with PublicData-CA, SecurePrivateData-CA) |
| Time 5: | combine( S/N-1, ..., S/N-N as S/N-CA ) Vendor 1 has aggregated the enumerated N product units into a single new serialized product unit now marked as S/N-CA; the contained quantity of N packaged units is specified in PublicData-CA; Vendor 1 proprietary information specific to unit S/N-CA is provided in SecurePrivateData-CA |
| Time 6: | move( S/N-CA to Loc2 ) |
| Time 7: | move( S/N-CA to Loc3 ) |
| Time 8: | move( S/N-CA to Vend2 ) Vendor 1 moved and then shipped or otherwise delivered the aggregated product unit S/N-CA to Vendor 2 |
| Time 9: | move( S/N-CA to Loc4 from Vend1 ) |
| Time 10: | move( S/N-CA to Loc5 ) Vendor 2 received the aggregated product unit S/N-CA at one location and subsequently moved the unit to another |
| Time 11: | create( S/N-R1, Hash-R1 by Vend1 at Loc5 with PublicData-R1, SecurePrivateData-R1 ) |
| Time 12: | create( S/N-R2, Hash-R2 by Vend1 at Loc5 with PublicData-R2, SecurePrivateData-R2 ) |
| Time 13: | split( S/N-CA to S/N-R1, S/N-R2 ) Vendor 2 repackaged the aggregated product unit S/N-CA into two new serialized product units, now marked as S/N-R1 and S/N-R2; the quantity of packaged units contained in each new repackaged unit is specified in PublicData-R*; Vendor 2 proprietary information specific to unit S/N-R* is provided in SecurePrivateData-R* |
| Time 14: | move( S/N-R1 to Loc6 ) |
| Time 15: | move( S/N-R2 to Loc7 ) |
| Time 16: | move( S/N-R1 to Vend3 ) |
| Time 17: | move( S/N-R2 to Vend4 ) |
| Time 18: | move( S/N-R2 to Loc8 from Vend2 ) |
| Time 19: | move( S/N-R2 to Loc9 ) |
| Time 20: | move( S/N-R1 to Loc10 from Vend2 ) |
| Time 21: | move( S/N-R1 to Loc11 ) Vendor 2 has moved and then shipped or otherwise delivered the two repackaged product units to Vendors 3 and 4; the remaining entries indicate the actual order of receipt by and movement internal to Vendors 3 and 4 |

Figure 10A:
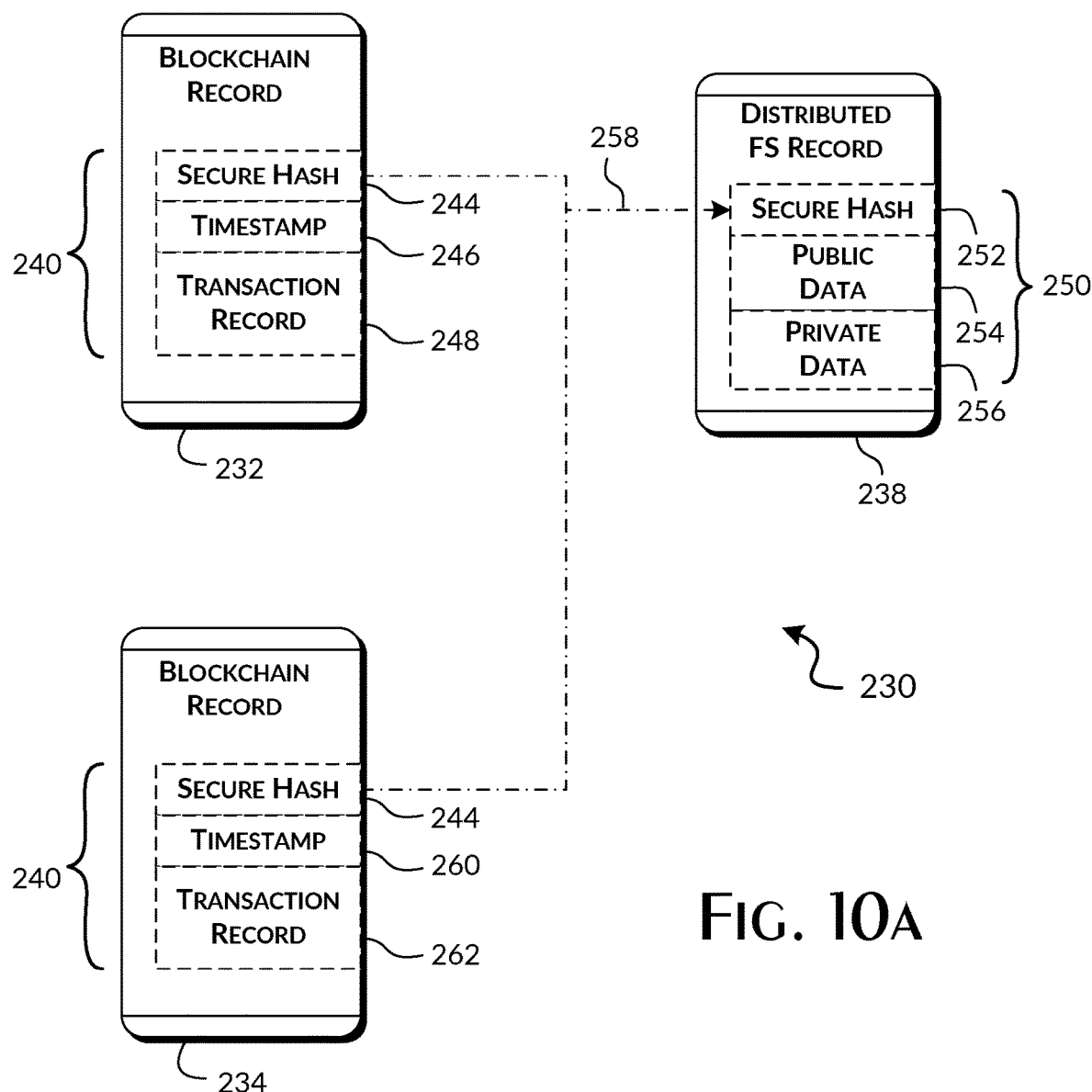
FIGS. 10A and 10B provide representational block diagrams of blockchain data records illustrating the data storage relationships defined between transaction event records as implemented in accordance with a preferred embodiment of the present invention.

FIG. 10A provides a representational illustration 230 of multiple blockchain records 232, 234, as stored on the blockchain 206, and a corresponding distributed filesystem record 238, as stored in the distributed filesystem 208, in accordance with a preferred embodiment of the present invention. Blockchain record 232 is representative specifically with respect to the structural content of the body 210 of each blockchain record 232, 234. Each body 210 preferably includes fields for the storage of a secure hash digest value 244, an encoded timestamp value 246, and a transaction record 248.

The secure hash digest value 244 is a copy of the secure hash digest value 152 generated by the serialization subsystem 140 for the product unit identified by the serial number 146. The value of the encoded timestamp 246 preferably represents the transaction event time-of-occurrence as assigned by a vendor and sent as part of each vendor protocol request 70 reporting a transaction event for recording on the blockchain 206. A separate blockchain intrinsic timestamp, generated by the node controller 204 in connection with the execution of the transactional contract 214 instance responsible for the addition of the blockchain record 232 to the blockchain 206, is stored in a header field of the blockchain record 232. The transaction record 248 preferably stores an identification of the functional operation that resulted in the creation of the blockchain record 232 and select elements of the input data used by the node controller 204 in execution of the corresponding transactional contract 214 instance. These select elements are derived from the set of possibly searchable fields contained within the public data 114. The elements selected are preferably chosen based on a number of factors including expected usefulness in responding to inquiry requests 202 and size of blockchain 206 storage space requirements. In the presently preferred embodiment of the present invention, these select elements preferably include vendor name and product unit location and may include associated product unit dates, and associated product identifiers, such as catalog number and technical and commercial names. The product unit location is preferably specified by or in combination with a standards-based geolocation identifier, such as geographic coordinates.

In response to a Create transaction functional operation request 216, the node controller 204 executes the transactional contract 214 to create and add the blockchain record 232 to the blockchain 206. Preferably at the same time, the node controller 204 writes the distributed filesystem record 238 to the distributed filesystem 208. Distributed filesystem record 238 is representative specifically with respect to the structural content of the body 250 of each distributed filesystem record 238. Each body 250 preferably includes fields for the storage of a secure hash digest value 252, a block of public data 254, and a block of encoded private data 226. The secure hash digest value 252 field preferably stores a copy of the value stored by the secure hash digest value 244 field. In the preferred embodiments, distributed filesystem records 238 are stored within the distributed filesystem 208 organized to support indexed selection and retrieval of a distributed filesystem record 238 based on the stored value of the secure hash digest value 252 field and, thereby, by reference 258 from the blockchain record 232. The public data 254 and private data 256 fields preferably store copies of the public and private data 114, 116 provided to the node controller 204 with the corresponding create transaction functional operation request 216.

Blockchain record 234 illustrates the results of a subsequent transfer transaction functional operation request 216. The blockchain record 234 has a body 210 that stores the same secure hash digest value 244 as blockchain record 232, thereby establishing that both reference the same unique product unit. The encoded timestamp 260 will have a value representing the transfer transaction event time-of-occurrence as assigned by the vendor. The transaction record 262 stores an identification of the transfer functional operation and related input data parameters, such as vendor and location, that characterize the transfer operation.

As an alternative to the preferred storage of both the public and private data 254, 256 in the body 250 of distributed filesystem records 238, either or both can be stored as part of the transaction record 248. Given that subsequent related blockchain records 234 will store the same secure hash digest value 244 as blockchain record 232, the blockchain records remain mutually related by reference.

Figure 10B:
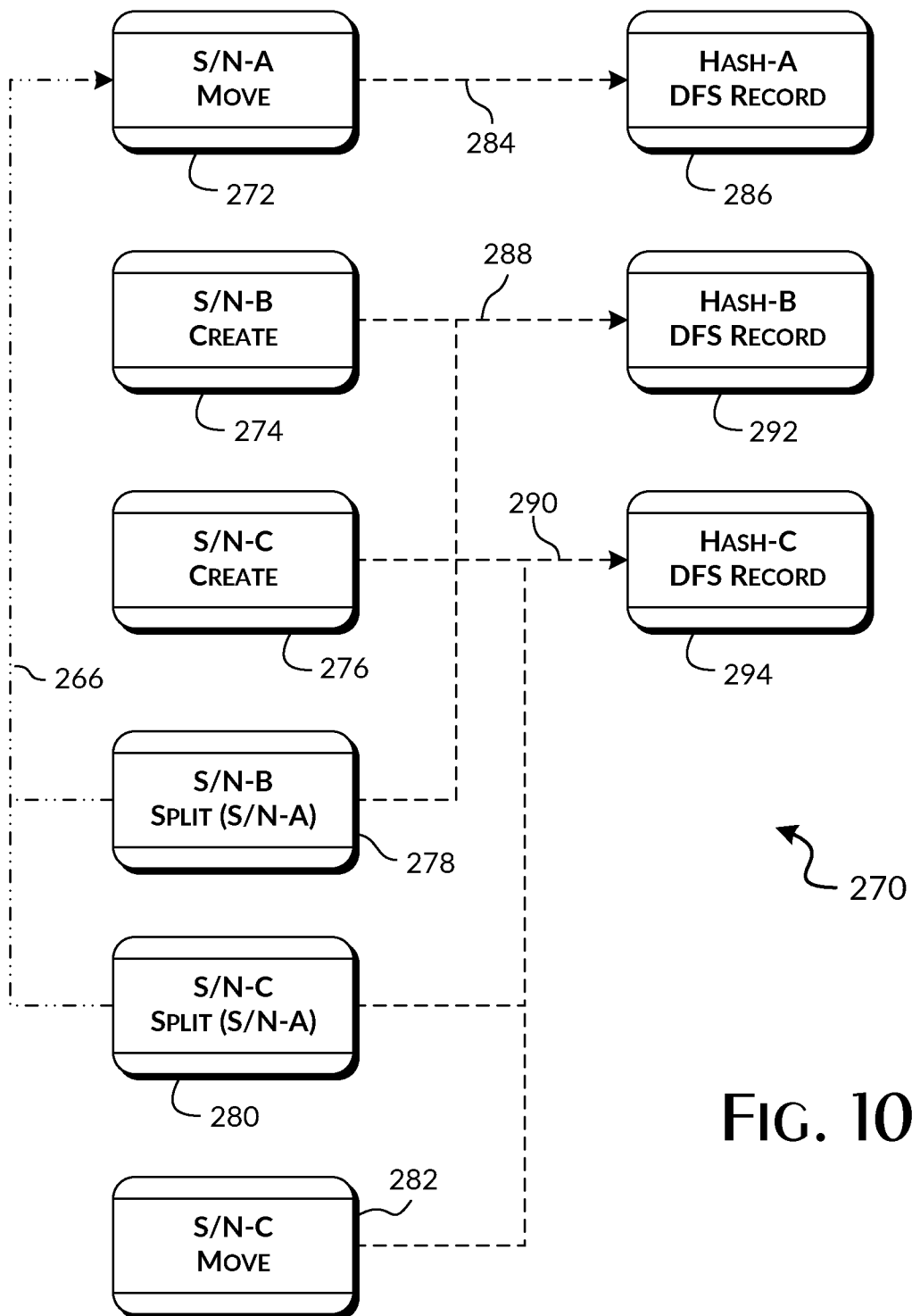

FIG. 10B provides a representational illustration 270 of a set of blockchain records 272, 274, 276, 278, 280, 282, each having a structural content body 240 (not separately shown), that have been stored on the blockchain 206. As indicated, an initially illustrated blockchain record 272 was stored to the blockchain 206 as the result of a transfer functional operation (Move) request 216 referenced to a specific serial number (S/N-A). The secure hash digest value (Hash-A), as stored in the blockchain record 272, references 284 a distributed filesystem record 286 stored within the distributed filesystem 208.

As illustrated, a subsequent aggregation functional operation, representing the splitting of the product unit identified as S/N-A into two new product units, denoted S/N-B and S/N-C, preferably occurs as a series of related functional operations. The blockchain records 274, 276 are first created and stored to the blockchain 206 as the result of Create functional operation requests 216 for the serial numbers S/N-B and S/N-C, respectively. The blockchain records 274, 276 further respectively store secure hash digest values Hash-B, Hash-C that reference 288, 260 the distributed filesystem records 262, 264, as stored within the distributed filesystem 208.

Two Split functional operations then result in the storage of the blockchain records 278, 280 having serial numbers S/N-B and S/N-C, respectively, to the blockchain 206. Preferably, the transaction records of both blockchain records 278, 280 include the S/N-A value to identify the product unit being aggregated. In accordance with the preferred embodiments of the present invention, inclusion of the aggregation source serial number effectively operates to provide a traceable back reference 266 that maintains the logical continuity of the transaction events recorded in the blockchain 206.

The secure hash digest value field within the body 240 of the Split functional operation blockchain records 278, 280 store the Hash-B and Hash-C values, respectively. The blockchain records 278, 280 thus reference 288, 290 and effectively share the distributed filesystem records 292, 294. As further illustrated, a subsequent transfer functional operation, issued with respect to the product unit identified as S/N-C, results in the storage of blockchain record 282 to the blockchain 206. The secure hash digest value field of the blockchain record 282 stores the Hash-C and thereby references 290 the distributed filesystem record 294.

The preferred ongoing operational methodology enabled by the preferred system embodiments of the present invention includes serialization, marking, and transactional event recording. The serialization operation, in essence, functions to establish a secure correspondence between a product unit serial number and a secure hash value. The product unit serial number acts as a unique public identifier of the product unit while the secure hash functions as the blockchain identifier. The result of serialization is the production of serialization data 160 that can then used by a vendor to label the product unit in a manner chosen by the vendor.

Figure 11:
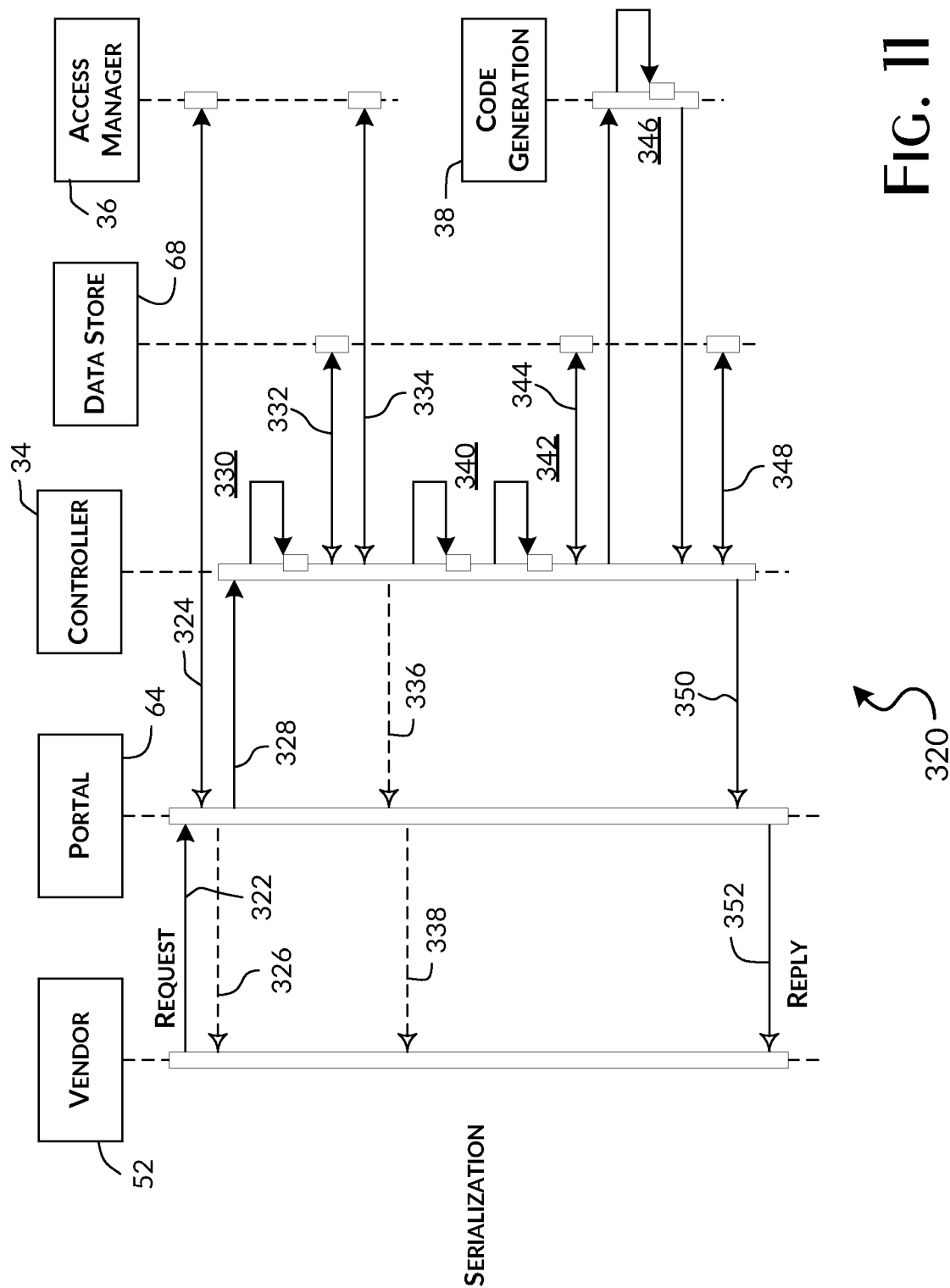
FIG. 11 provides a sequence flow diagram describing a preferred serialization process as implemented in accordance with a preferred embodiment of the present invention.

The preferred sequencing of the serialization operation 320 is shown in FIG. 11. A vendor serialization request 112, as sent 322 from a vendor system 52 to the portal server 64, includes a request type identifier and public data. Optionally, a vendor proposed serial number and vendor private data 116 are also included. The identity of the vendor system 52 is authenticated 324 by the access manager 36. Either an authentication failure reply is returned 326 to the vendor system 52 or the request 112 is forwarded 328 to the platform controller 34. The data content of the request 112 is converted 330 to an internal neutral data format and preferably stored 332 as a record set in the data store server 68. The platform controller 34 then determines whether the requested operation is authorized 334 given the associated data content of the request 112. Any authorization failure reply is relayed 336, 338 to the vendor system 52.

Where authorized, the platform controller 34 proceeds to generate 340 a unique nonce and either qualify the vendor proposed serial number or derive a suitable serial number from the nonce. A corresponding secure hash is then computed and secure signature generated 342 and stored 344 against the signed data. The serialization data 160 is then generated 346 and the corresponding serialization request records in the data store server 68 are finalized 348. A vendor serialization reply including the serialization data 160 is then returned 350, 352 to the vendor system 52.

Figure 12:
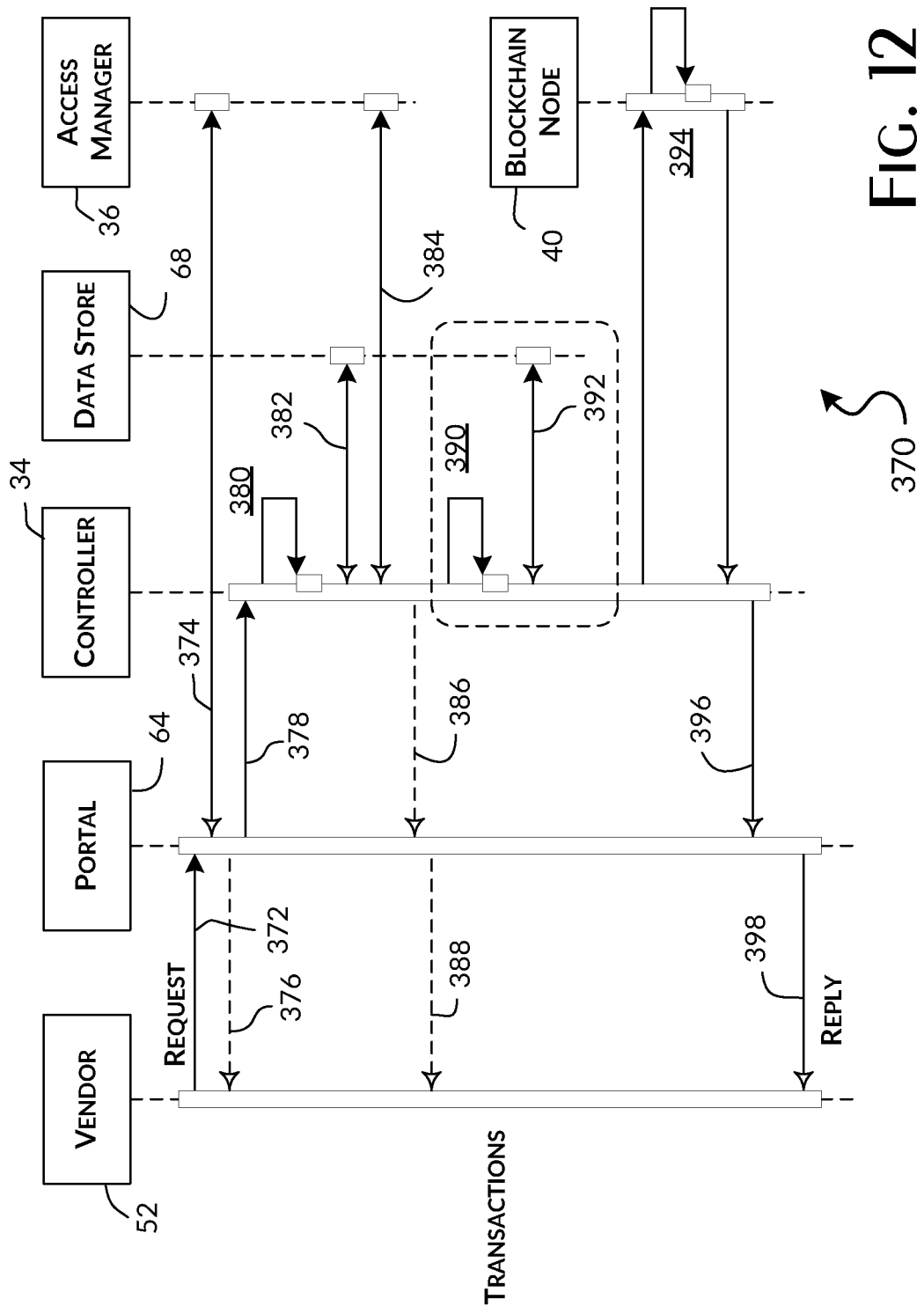
FIG. 12 provides a sequence flow diagram describing a preferred transaction request handling process as implemented in accordance with a preferred embodiment of the present invention.

The preferred sequencing of the transaction event recording operation 370 is shown in FIG. 12. A vendor transaction request 202, as sent 372 from a vendor system 52 to the portal server 64, includes a request type identifier, either the serial number or secure hash identifying the product unit as obtained through a prior serialization operation 320, transaction event data, and an event timestamp. The identity of the vendor system 52 is authenticated 374 by the access manager 36. Either an authentication failure reply is returned 376 to the vendor system 52 or the request 202 is forwarded 378 to the platform controller 34. The transaction event data provided with the request 202 is converted 380 to an internal neutral data format and preferably stored 382 as a record set in the data store server 68. The platform controller 34 then determines whether the requested operation is authorized 384 given the information included with the request 202 and prior related data stored during the serialization operation. Any authorization failure reply is relayed 386, 388 to the vendor system 52.

Given an authorized vendor transaction request 202, the platform controller then proceeds to produce a set of functional operations that collectively represent the request 202. Preferably, the functional operations are produced in a subsequence that includes the sequential generation 390 of a functional operation in combination with retrieval 392 of the appropriate transaction related data from the record set prior stored to the data store server 68. Each resulting functional operation preferably includes a corresponding secure hash 244, timestamp 246, transaction record 248, and, where applicable, a copy of the public and private data 254, 256. The set of functional operations are then preferably issued sequentially 394 to a distributed ledger server node 40. A vendor transaction reply including a status value effectively reporting the results of the set of functional operations is then returned 396, 398 to the vendor system 52.

The preferred inquiry methodology supported by the preferred system embodiments of the present invention enables querying the collection of blockchain records to track and trace the transaction evented path of serialized product units throughout the supply chain. A query request is preferably specified in terms of a request type, either track or trace, and a set of query parameters. These parameters may be specified in terms of some combination of sets or ranges of serial numbers, vendors, locations, and timestamps. Other parameters, such as lot number, NDC identifier, and carrier, can also be specified. For a tracking type query request, the reported information will describe the path and end disposition of the product unit or units effectively identified by the query parameters. A trace type query request is the complementary operation and will report the path and origin of the product unit or units effectively identified by the query parameters. As applied in the exemplary case of pharmaceutical supply chains, a serialized product unit, itself containing multiple serialized product units, can be tracked from manufacture through all movements, including splitting into other serialized product units, to dispensing to an end user. Similarly, given a serial number of a product unit occurring anywhere in the supply chain, the distribution path, taking into account splits from containing serialized product units, to an ultimate manufacturing origin can be traced.

Figure 13:
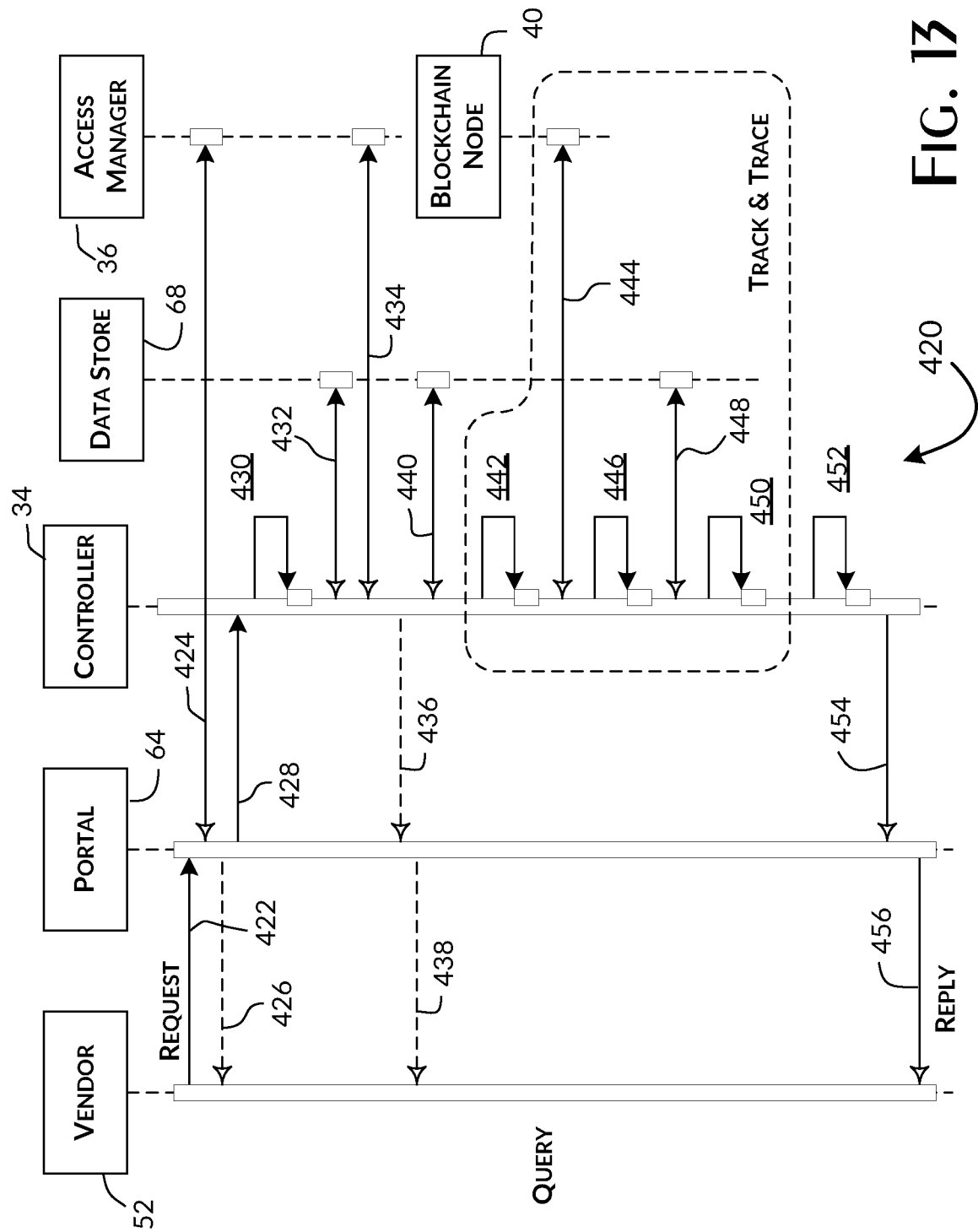
FIG. 13 provides a sequence flow diagram describing a preferred transaction inquiry process as implemented in accordance with a preferred embodiment of the present invention.

The preferred sequencing of a query operation 420 is shown in FIG. 13. A query request 202, as sent 422 from a vendor system 52 to the portal server 64, includes a request type identifier and a set of query parameters. The identity of the vendor system 52 is authenticated 424 by the access manager 36. Either an authentication failure reply is returned 426 to the vendor system 52 or the request 202 is forwarded 428 to the platform controller 34. The query parameter data provided with the request 202 is converted 430 to an internal neutral data format and optionally stored 432 as a record set in the data store server 68. The platform controller 34 then determines whether the requested operation is authorized 434 given the information included with the request 202 and prior related data stored during the serialization operation. Any authorization failure reply is relayed 436, 438 to the vendor system 52.

Provided authorization is granted, the query parameters are retrieved 440 and, if appropriate, expanded to terms suitable for use in selecting corresponding blockchain records from the distributed ledger server node 40. Expansion preferably involves identifying the set of secure hashes that are identified with the query parameters. For example, given a vendor identification and serial number, a non-authoritative hash can be retrieved 440 from the data set records stored by the data store server 40. Likewise, where the vendor and lot number are specified, a non-authoritative hash set can be retrieved 440. For all expansions, the non-authoritative lookup using the data store server 68 records is a performance optimization. Preferably, any non-authoritative set of secure hashes is validated by accessing (not shown) the corresponding blockchain records from the distributed ledger server node 40.

Once the query parameters have been expanded, if appropriate, the platform controller 34 generates 442 a functional operation to read a corresponding set of blockchain records. This functional operation is issued 444 to the distributed ledger server node 40. The execution of the transactional contract 214 matches the provided query parameters to the secure hash 244, timestamp 246, fields of the transaction record 248, and as needed to the fields of the public data 254, all as contained within potentially matching blockchain records. For matched blockchain records, the corresponding blockchain record and filesystem record bodies 240, 250 are returned to the platform controller 34.

The returned blockchain record information is collected 446 into reportable records optionally stored 448 to the data store server 68. The platform controller 34 then determines 450 if any set of secure hashes have been referenced through a transaction record 248 representing an aggregation operation. The subsequence of steps 442, 444, 446, 448, 450 is repeated as necessary to evaluate any referenced set of secure hashes identified in the prior iteration. The direction of the references to follow is selected based on the track or trace type of the query request. Finally, the collected reportable records are consolidated 452 and returned 454, 456 as part of a query reply to the vendor system 52.

Discrepancies in the distribution path of a serialized product unit can be detected by a combination of track and trace operations. Given a serial number representing a target serialized product unit, a trace operation can be used identify whatever serialized product unit that was functionally split in the creation of the target serialized product unit. The blockchain record describing the split functional operation will provide the set of created serial numbers and implicitly define the corresponding distribution paths. If the target serial number is not within this set, the target product unit is presumptively counterfeit. Even if the serial number exists within the set, if the location, vendor, or any other information given in the blockchain record associated with the target serialized product unit fails to match that obtained by tracking the product unit from the split operation, the target product unit is again presumptively counterfeit.

Thus, an efficient method of securely serializing supply chain products for the recording of the transaction history thereof as transferred within and between the participant vendors, including consumers, has been described.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of securely serializing product units distributed within and between supply chain participant vendors, the method comprising:
   (a) receiving vendor data including vendor public data descriptive of a given product unit, and converting the vendor public data from a vendor specific format to a vendor neutral format;
   (b) generating a unique serial number to be securely associated with the given product unit, the unique serial number including a public serial number and a unique nonce;
   (c) generating a cryptographic hash of the unique serial number and the vendor public data;
   (d) generating a cryptographic signature of the cryptographic hash using a predetermined private key;
   (e) returning marking data, which marking data includes (i) the public serial number and (ii) at least a subset of the vendor public data, wherein the marking data is provided in a predefined format suitable for generation of a marker uniquely associable with the given product unit, the data content of the marker being readable by any combination of electronic and optical sensors;
   (f) receiving the public serial number and transaction event data;
   (g) retrieving the cryptographic hash corresponding to the public serial number;
   (h) deriving a transaction record from the transaction event data; and
   (i) sending the cryptographic hash and the transaction record to a distributed ledger node for storage in a blockchain record.

2. The method of claim 1 wherein the vendor data further includes vendor private data that is encrypted as received.

3. The method of claim 2 wherein generating a cryptographic hash in part (c) comprises generating the cryptographic hash based on the unique serial number, the vendor public data, and a cryptographic hash value of the vendor private data.

4. The method of claim 3 wherein sending in part (i) includes selectively including the vendor public data and the vendor private data in a transmission to the distributed ledger node for storage in correspondence with the blockchain record.

5. The method of claim 4 wherein deriving in part (h) includes selecting data from the transaction event data.

6. The method of claim 3 wherein receiving in part (f) includes converting the transaction record from the vendor specific data format to the vendor neutral data format.

7. A method of securely serializing product units to provide a trusted basis for the recording of transaction events reflecting distribution actions within and between supply chain participant vendors, the method comprising:
   (a) receiving a serial number request including vendor data from a given supply chain vendor, the vendor data including vendor public data, descriptive of a given product unit, and vendor private data associated with the given product unit by the given supply chain vendor, the vendor private data being subject to being encrypted by the given supply chain vendor;
   (b) converting the vendor public data from a first format defined by the given supply chain vendor to a second format selected independent of the given supply chain vendor;
   (c) generating a serial number, including a public serial number and a unique nonce, for the given product unit;
   (d) securing the serial number by:
      (i) computing a private cryptographic hash value for the vendor private data, wherein the private cryptographic hash value is zero where the vendor private data is empty;
      (ii) computing a public cryptographic hash value for the serial number, the vendor public data, and the private cryptographic hash value; and
      (iii) computing a cryptographic secure signature of the public cryptographic hash value using a predetermined private key; and
   (e) returning the public serial number to the given supply chain vendor.

8. The method of claim 7 further comprising preparing marking data including the public serial number, the public cryptographic hash value, and at least a subset of the vendor public data, and wherein returning in part (e) includes returning the marking data.

9. The method of claim 8 wherein preparing marking data comprises providing the marking data in a predefined format suitable for the generation of a marker uniquely associable with the given product unit, the data content of the marker being readable by any combination of electronic and optical sensors.

10. The method of claim 9 further comprising:
    (a) receiving a transaction request including vendor transaction event data from the given supply chain vendor, the vendor transaction event data including the public serial number;
    (b) converting the transaction event data from the first format to the second format;
    (c) obtaining the public cryptographic hash value corresponding to the public serial number;
    (d) deriving a transaction record from the transaction event data; and
    (e) sending the public cryptographic hash and the transaction record to a distributed ledger node for storage in a blockchain record.

11. The method of claim 10 further comprising determining a type of the transaction request, and wherein sending the transaction record comprises selectively sending the transaction record depending on the type of the transaction request.

12. The method of claim 11 wherein the vendor public data and the vendor private data are stored in the blockchain record.

13. The method of claim 11 wherein the vendor public data and the vendor private data are stored by the distributed ledger node in secure correspondence with the blockchain record.

* * * * *